United States Patent
Randløv

(10) Patent No.: US 9,018,813 B2
(45) Date of Patent: Apr. 28, 2015

(54) LINEAR ACTUATOR

(75) Inventor: Michael Lindekilde Randløv, Vojens (DK)

(73) Assignee: Linak A/S, Nordborg (DK)

( * ) Notice: Subject to any disclaimer, the term of this patent is extended or adjusted under 35 U.S.C. 154(b) by 414 days.

(21) Appl. No.: 13/511,318

(22) PCT Filed: Nov. 25, 2010

(86) PCT No.: PCT/DK2010/000156
§ 371 (c)(1),
(2), (4) Date: May 22, 2012

(87) PCT Pub. No.: WO2011/063811
PCT Pub. Date: Jun. 3, 2011

(65) Prior Publication Data
US 2012/0248910 A1    Oct. 4, 2012

(30) Foreign Application Priority Data
Nov. 28, 2009   (DK) .................................. 2009 01262

(51) Int. Cl.
*H02K 5/04*      (2006.01)
*A47B 9/04*      (2006.01)
*H02K 7/06*      (2006.01)

(52) U.S. Cl.
CPC .... *A47B 9/04* (2013.01); *H02K 7/06* (2013.01)

(58) Field of Classification Search
USPC ................ 310/83, 89; 74/16, 841; 312/319.8; 403/403
See application file for complete search history.

(56) References Cited

U.S. PATENT DOCUMENTS

| 1,741,189 | A  | * | 12/1929 | Jencks ........................... 108/57.3 |
| 6,478,269 | B2 | * | 11/2002 | Forsberg ..................... 248/188.5 |
| 6,509,705 | B2 |   | 1/2003  | Bastholm et al. |
| 6,880,416 | B2 |   | 4/2005  | Koch |
| 7,495,359 | B2 |   | 2/2009  | Klinke et al. |
| 8,896,172 | B2 | * | 11/2014 | Mori et al. ....................... 310/89 |
| 2003/0146425 | A1 |   | 8/2003  | Drake et al. |
| 2006/0279143 | A1 | * | 12/2006 | Platz et al. ....................... 310/51 |
| 2009/0071271 | A1 |   | 3/2009  | Nielsen et al. |
| 2010/0083793 | A1 | * | 4/2010  | Ko ................................... 74/640 |

FOREIGN PATENT DOCUMENTS

| DE | 19856864 |    | 6/2000 |           |
| DE | 20105871 |    | 7/2001 |           |
| DE | 20111205 |    | 10/2001 |          |
| EP | 1079511  | A1 * | 2/2001 | .............. H02P 7/285 |
| WO | 02/39848 | A1 * | 5/2002 | ............... A47B 9/04 |

OTHER PUBLICATIONS

English Abstract of DE19856864.

* cited by examiner

*Primary Examiner* — Burton Mullins
(74) *Attorney, Agent, or Firm* — Dykema Gossett PLLC

(57) ABSTRACT

A linear actuator, especially for telescopic lifting columns (7) comprising a reversible electric motor (16) and a transmission (17) located in a box-shaped housing (14). A Linear movable activation element (18), preferably a spindle unit (19-21) connected to the transmission (17) is secured to the housing (14)). The activation element is intended for moving an adjustable element, e.g. a table top in the structure into which the actuator should be incorporated. The housing (14) is equipped with internal reinforcements (32) for strengthening said housing in its longitudinal direction and possibly also in its transverse direction. Thus a linear actuator with sufficient rigidity for use in sitting/standing tables without cross member is achieved.

5 Claims, 4 Drawing Sheets

LINEAR ACTUATOR

BACKGROUND OF THE INVENTION

1. Field of the Invention

The present invention relates to a linear actuator, especially for use in a telescopic lifting column.

2. The Prior Art

Height-adjustable desks, also known as sitting/standing tables, comprise a frame with an upper frame and a lower frame. The upper frame typically consists of two transverse members connected to two parallel sections. A table top is carried by and secured to the upper frame. The lower frame comprises a telescopic lifting column, designed as a table leg, at each side, the lifting columns being mutually connected by a cross member. A foot, typically elongated, faces across the table and is secured to the lower end of the telescopic columns, The telescopic columns are driven by a linear actuator comprising a box-shaped housing containing a reversible electric motor and a transmission. Secured to the bottom of the box-shaped housing is a linear movable activation element consisting of a spindle unit, connected to the transmission through a hole in the bottom of the housing. The housings of the linear actuators face along the table and towards each other. The upper frame of the table is secured to the lower frame by means of the housings of the linear actuators, which are located between the two parallel beams of the upper frame and are secured by screws in the side of the housings. Likewise, the transverse members of the upper frame are usually also secured by screws in the end of the housing of the actuator. Such construction is for instance disclosed in EP 1 079 511 A1, Linak A/S. The cross member, which is secured to the top of a fixed member of the telescopic lifting columns, contributes significantly to the stability of the table in the longitudinal direction.

EP 1 274 330 B1, Okin Gesellschaft für Antriebstechnik mbH Co. KG, discloses an example of a lifting column where the spindle unit is placed at one end of the housing so that the housing is located perpendicularly to the telescopic guide. For cost and production reasons, but also for weight reasons, the two parallel beams are gradually replaced with beam sections. As these beam sections are not continuous, they do not contribute as much to the stability in the longitudinal direction as the through-going beams. For appearance reasons it is also desired that the housing of the linear actuator is as small as possible, so that it may be hidden under the table top. In order to construct the housing as low as possible "flat" electric motors are among other things used, cf. e.g. WO 2004/100632 A1 Linak A/S. This small and low housing also contributes to reducing the stability in the cross direction of the table. For that reason the cross member is particularly important for the stability. On the other hand, there is a distinct desire to eliminate the cross member both visually, due to cost and construction, but also for safety reasons. The latter is due to the risk of squeezing between the underside of the upper frame/the table top and the cross member. By removing the cross member problems with the stability however occur in the longitudinal direction. This is sought solved with various types of angular reinforcements in the angle between the underside of the housing and the side of the telescopic guide in the lifting column. WO 2006/053559 A2 Linak A/S discloses an example of this where a triangular plate element is welded on. This is however only possible in case of a lifting column of the type up-side-down, i.e., where the outmost member of the telescopic guide is secured to the underside of the housing.

The purpose of the invention is to provide a solution to the outlined problem with strengthening in the longitudinal direction of the table, in which the solution is not price-raising or noticeable price-raising and where the solution does not disturb the appearance of the table.

SUMMARY OF THE INVENTION

This is achieved according to the invention by furnishing the housing of the linear actuator with internal reinforcements for strengthening the housing in its longitudinal direction and possibly also in its transverse direction. Surprisingly, it has turned out that a satisfactory rigidity in the longitudinal direction of the table may be achieved with particularly expedient embodiments and positioning of strengthening means inside the housing, despite its small dimensions.

A particularly expedient embodiment and positioning of strengthening means is constituted by inclined plate pieces secured to the sides and/or ends and bottom of the housing. The reinforcements are thus inclined in the angle between the side/end and the bottom and do for that reason not take up much room, but still provide the desired rigidity.

An embodiment for the invention will be described more fully with reference to the accompanying drawings.

DETAILED DESCRIPTION OF DRAWINGS

Figure 1:
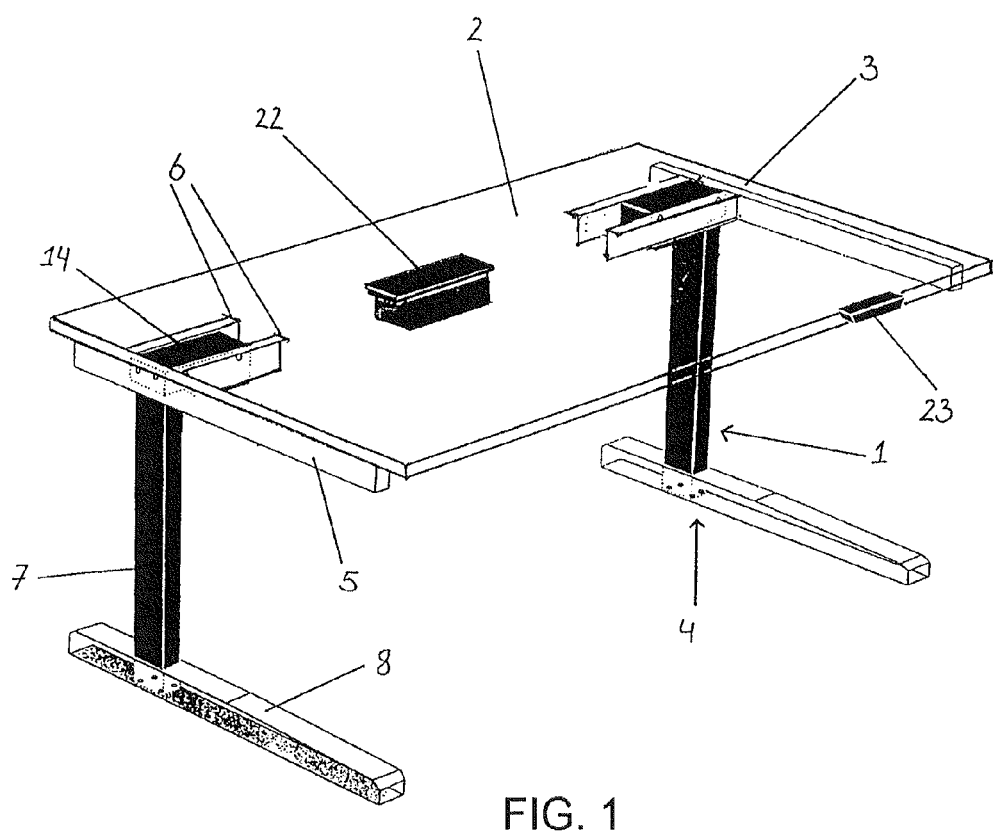
FIG. 1 shows a sitting/standing table shown with transparent table top.

FIG. 1 shows a sitting/standing work table with a height-adjustable table top, shown transparent. The table comprises a frame 1, on which is mounted a table top 2. The frame consists of an upper frame 3 and a lower frame 4. The upper frame 3 consists of two individual inverted parts, each comprising a cross member 5 having two attached beam sections 6. In each side, the lower frame 4 comprises a telescopic lifting column 7 designed as table legs. An elongated foot 8 extendinq across the table is secured to the lower ends of the telescopic columns 7.

Figures 2, 3:
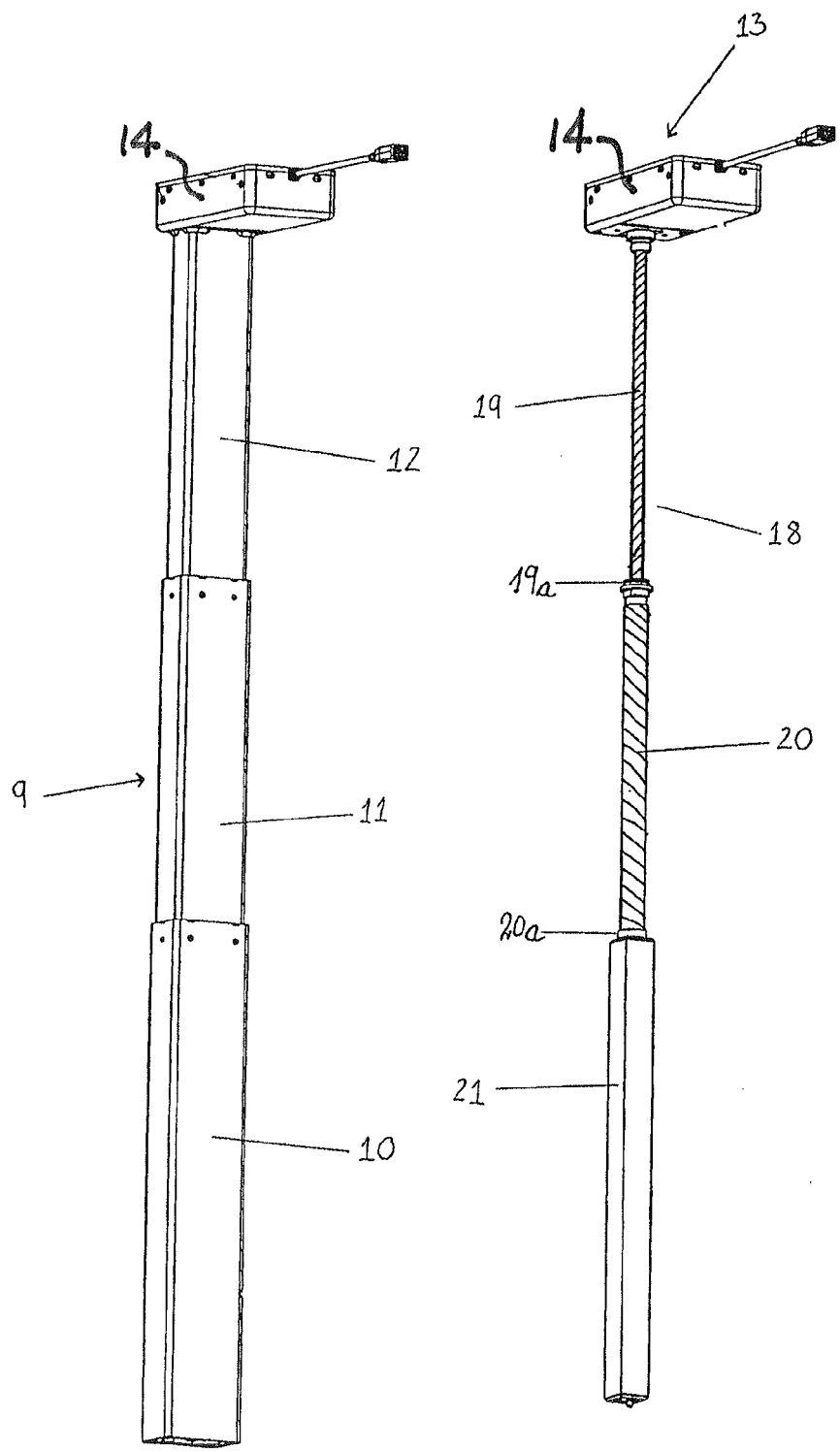
FIG. 2 shows an extended lifting column.
FIG. 3 shows an extended linear actuator for the lifting column.
Figure 4:
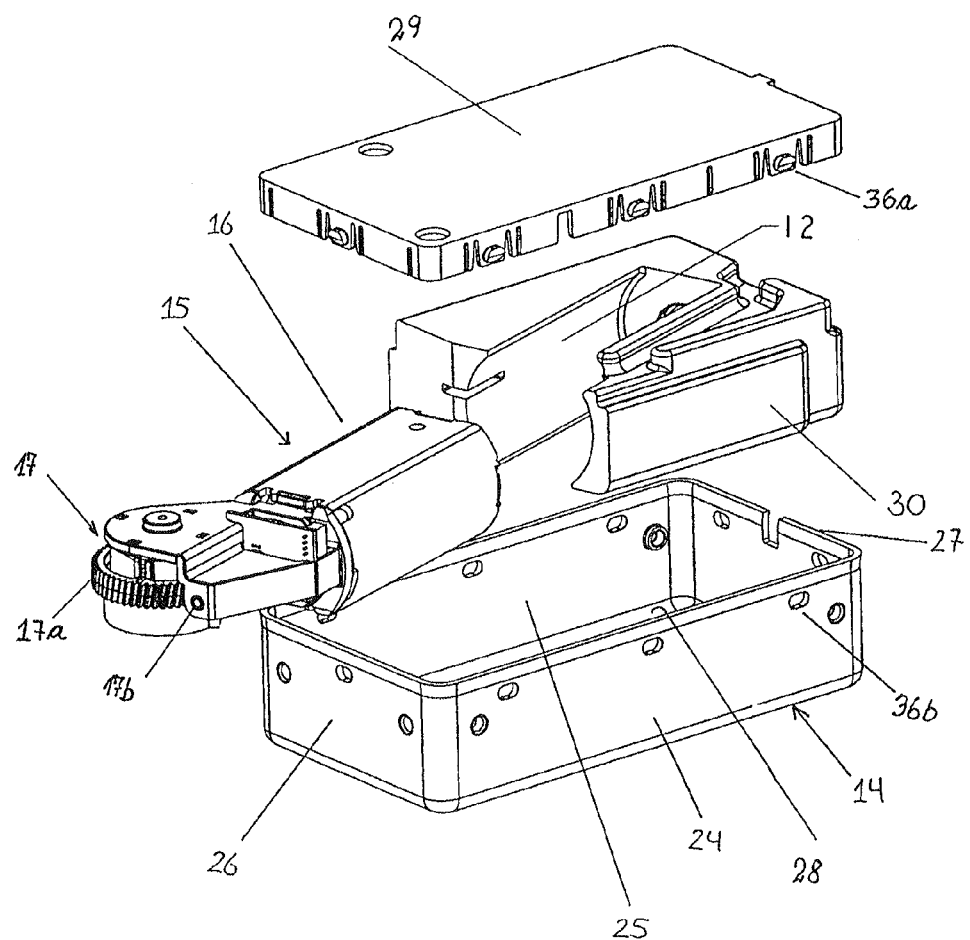
FIG. 4 shows an exploded view of the housing with motor unit for the linear actuator.

As it appears from FIGS. 2 and 3, the telescopic lifting columns 7 comprise a telescopic guide 9 consisting of three telescopic members 10,11,12 and a linear actuator 13 for adjusting the lifting column. As it appears from FIG. 4, the linear actuator has a box-shaped housing 14 containing a motor unit 15 with a reversible electric motor 16 and a transmission 17, here a worm gear consisting of a worm wheel 17a and a worm 17b as an extension of the motor shaft. Secured to the bottom of the box-shaped housing 14 is a linear movable activation element consisting of a spindle unit 18 connected to the transmission 17 of the motor unit through a hole in the bottom 28 of the housing. The spindle unit 18 consists of a solid spindle 19, a hollow spindle 20 and a tube 21 with a spindle nut 20a at the top. Likewise, a spindle nut 19a for the solid spindle 19 is positioned topmost in the hollow spindle 21. The housing 14 of the linear actuators faces along the table and towards each other. The upper frame 3 of the table is secured to the lower frame 4 by means of the housing 14 of the linear actuators. The housing 14 is located between the two parallel beam sections 6 and is secured by means of screws in the side of the housing 14. Likewise the cross members 5 of the upper frame are secured by means of screws in the end of the housing 14 of the actuator. For the sake of completeness, it is noted that a control box 22 containing a power supply and a control unit is located under the table top 2, just as there is an operating panel 23 at the front edge of the table top.

The housing 4 of each linear actuator consists of a deep drawn flat, rectangular steel box with two parallel sides 24,25 and a front end 26 and a rear end 27, which likewise are parallel, and also a bottom 28. The top of the housing may be closed by means of a cover 29, which typically is made of plastic and retained in a snap-lock connection with pins 36a, which resiliently extend into holes 36b intended for that purpose in the side walls 24,25 as well as in the front end 26 and rear end 27 of the housing. For retaining the motor unit 15, a foam block 30 with a recess containing the motor 16 of the motor unit is located in the housing 14.

Figure 5:
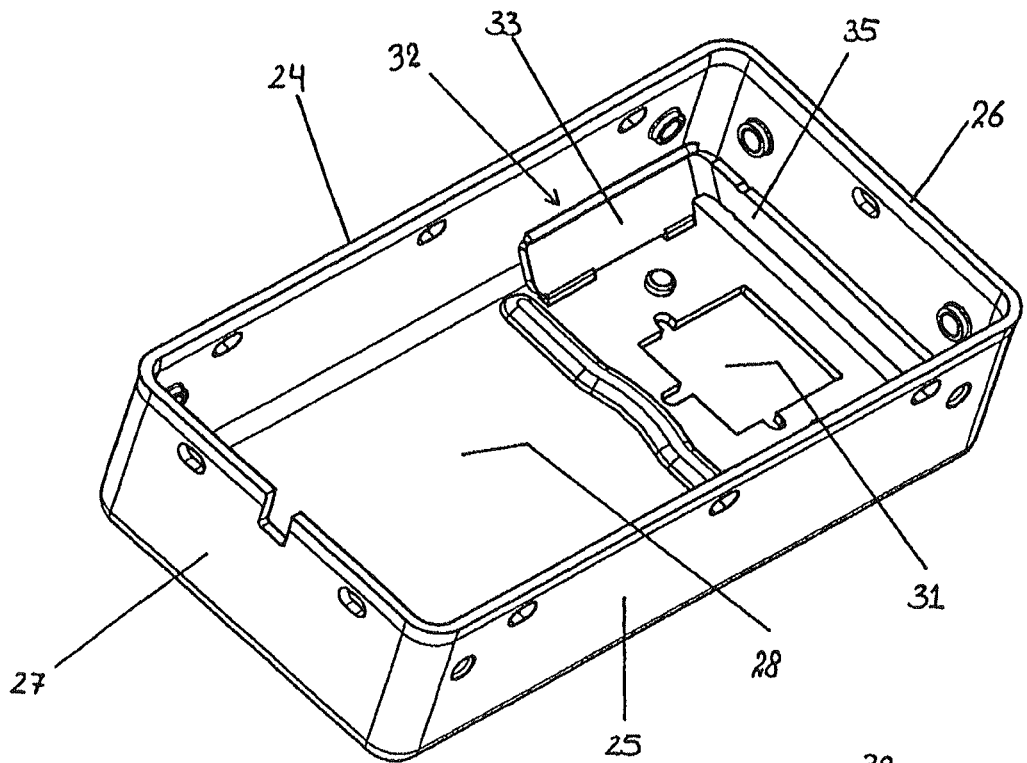
FIG. 5 shows a perspective view into the housing with a mounted U-shaped reinforcement.
Figure 6:
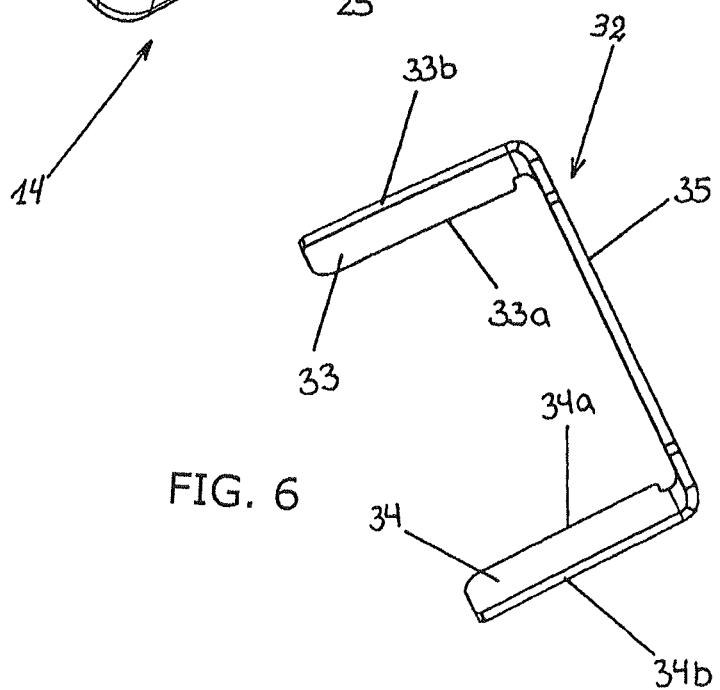
FIG. 6 shows a perspective view of the U-shaped reinforcement in FIG. 5.

FIG. 5 shows a perspective view of the empty housing, where the hole 31, in which the spindle unit 18 with the upper end is mounted, is visible. In this end of the housing 14 at the bottom 28 a U-shaped reinforcement 32 consisting of two parallel, inclined, plate-shaped legs 33,34 is mounted, so that these with a lower side edge 33a, 34a abuts the bottom 28 and with an upper side edge 33b, 34b abuts the respective side walls 24,25 of the housing. A connection piece 35 between the two legs 33,34 is straight and planar and in a planar manner abuts the front end 26 of the housing 14. The reinforcement 32 is welded to the housing with its side edges 33a, 33b; 34a, 34b to the sides 24,25 and the bottom 28, respectively. The legs 33,34 of the reinforcement function as inclined braces for the side walls 24,25 and bottom 28 of the housing, while the connection piece 35 functions as support for the front end 26. The reinforcement may be punched and bent from a plate blank, and is easy to place and weld in the housing. The reinforcement is thus relatively inexpensive in terms of manufacturing and assembly just as it is not visible from the outside. The solution may be used in lifting columns, regardless of whether the outermost member 10 of the column is at the bottom or at the top.

The invention claimed is:

1. In a linear actuator which includes (1) a box-shaped housing containing a reversible electric motor and a transmission, and (2) a linear movable activation element, the box-shaped housing including opposite first and second side walls, opposite first and second end walls, a bottom wall having a hole, a cover, and the linear movable activation element extending through the hole in the bottom wall of the housing to connect with the transmission, the improvement wherein said housing includes an internal reinforcing means comprising first and second plate segments, said first plate segment being positioned in an inclined manner between said first side wall and said bottom wall, and said second plate segment being positioned in an inclined manner between said second side wall and said bottom wall, said first plate segment being connected to said bottom wall and said first side wall, and said second plate segment being connected to said bottom wall and said second side wall.

2. The linear actuator according to claim 1, wherein said internal reinforcing means includes a connection piece extending between and connected to said first and second plate segments to form a generally U-shaped element.

3. The linear actuator according to claim 2, wherein said connection piece is a planar plate that contacts said second end wall.

4. The linear actuator according to claim 3, wherein said planar plate is welded to said second end wall.

5. The linear actuator according to claim 1, wherein said first and second plate segments are welded at side edges thereof to said bottom wall and said first and second side walls, respectively.

* * * * *